(12) United States Patent
Choi

(10) Patent No.: US 10,365,917 B2
(45) Date of Patent: Jul. 30, 2019

(54) METHOD AND APPARATUS FOR CONTROLLING ELECTRONIC DEVICE OF VEHICLE

(71) Applicant: Hyundai Motor Company, Seoul (KR)

(72) Inventor: Kee Hoon Choi, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 7 days.

(21) Appl. No.: 15/381,839

(22) Filed: Dec. 16, 2016

(65) Prior Publication Data
US 2017/0371640 A1    Dec. 28, 2017

(30) Foreign Application Priority Data
Jun. 22, 2016    (KR) .................. 10-2016-0077918

(51) Int. Cl.
| | | |
|---|---|---|
| *G06F 8/65* | (2018.01) | |
| *B60R 16/02* | (2006.01) | |
| *H04L 29/08* | (2006.01) | |

(52) U.S. Cl.
CPC ............. *G06F 8/65* (2013.01); *B60R 16/02* (2013.01); *H04L 67/12* (2013.01); *H04L 67/34* (2013.01)

(58) Field of Classification Search
None
See application file for complete search history.

(56) References Cited

U.S. PATENT DOCUMENTS

| | | | | |
|---|---|---|---|---|
| 6,904,325 | B2 * | 6/2005 | Shi ...................... | G11C 16/102 700/2 |
| 7,266,817 | B1 * | 9/2007 | Barrett .................. | G06F 8/71 717/120 |
| 2003/0208579 | A1 * | 11/2003 | Brady, Jr. ............. | G06F 8/65 709/223 |
| 2005/0102665 | A1 * | 5/2005 | Barta .................... | G06F 8/61 717/174 |
| 2007/0239794 | A1 * | 10/2007 | Metzner ............... | G06F 16/282 |
| 2012/0066669 | A1 * | 3/2012 | Bouzakis ............. | G06F 8/658 717/168 |
| 2014/0068613 | A1 * | 3/2014 | Iriguchi ............... | G06F 8/656 718/1 |

(Continued)

FOREIGN PATENT DOCUMENTS

| | | |
|---|---|---|
| JP | 2014067402 A | 4/2014 |
| JP | 2014181578 A | 9/2014 |

(Continued)

OTHER PUBLICATIONS

Sommer, "Scheduling Algorithm for Simultaneous Software Updates of Electronic Device in Vehicles", 2008, IEEE ICC 2008 Workshop Proceeding (Year: 2008).*

*Primary Examiner* — Hossain M Morshed
(74) *Attorney, Agent, or Firm* — Brinks Gilson & Lione

(57) ABSTRACT

A method for controlling software needed to drive an in-vehicle electronic device includes receiving a data package including a plurality of data needed to update software of a vehicle and applying either a parallel update procedure or a sequential update procedure according to inclusion or non-inclusion of primary data in the data package. The plurality of data includes at least one of primary data and secondary data. The primary data and secondary data are classified according to a data type or update target region.

13 Claims, 9 Drawing Sheets

(56) References Cited

U.S. PATENT DOCUMENTS

| | | | |
|---|---|---|---|
| 2015/0178067 A1* | 6/2015 | Ji | G01C 21/36 717/170 |
| 2015/0242198 A1* | 8/2015 | Tobolski | G06F 8/61 717/172 |
| 2016/0364224 A1* | 12/2016 | Tuukkanen | G06F 8/65 |
| 2017/0293481 A1* | 10/2017 | Gimenez Pallar S | G06F 8/65 |
| 2017/0315797 A1* | 11/2017 | Vangelov | G06F 8/65 |
| 2017/0371640 A1* | 12/2017 | Choi | B60R 16/02 |

FOREIGN PATENT DOCUMENTS

| | | |
|---|---|---|
| KR | 20110076432 A | 7/2011 |
| KR | 20130110486 A | 10/2013 |
| KR | 10-1527779 B1 | 6/2015 |

\* cited by examiner

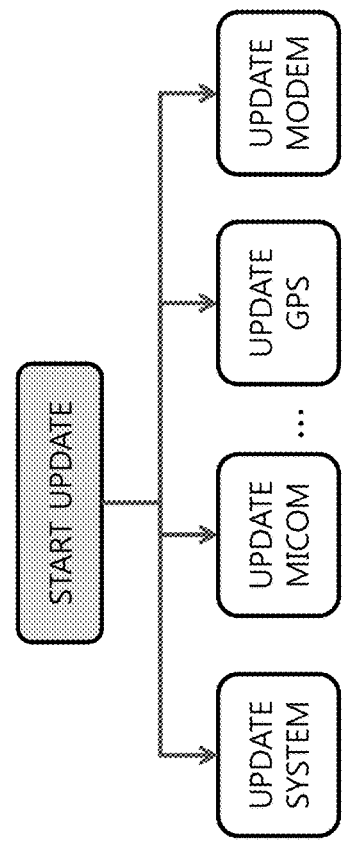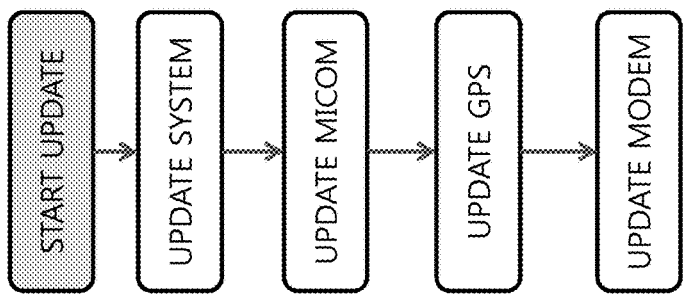
FIG.1

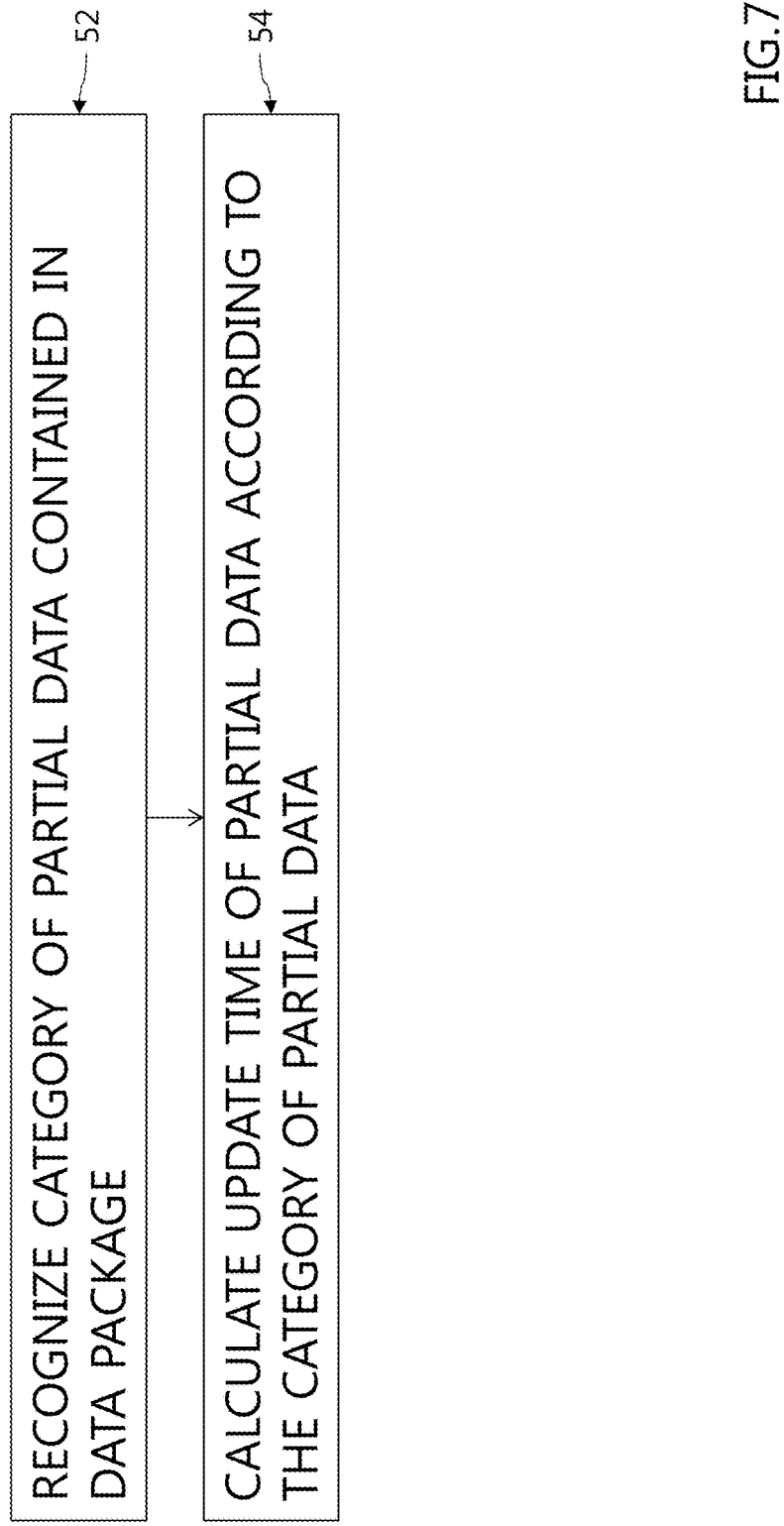

| TYPE | UPDATE TIME (sec) | SOFTWARE SIZE (Bytes) | UPDATE SPEED (Bytes/sec) | CALCULATION | REMARKS |
|---|---|---|---|---|---|
| SYSTEM | Tsys | SW_sys | IO_sys | Tsys = SW_sys / IO_sys | ON-BOARD DEVICE SUPPORTING INTERNAL COMMUNICATION (UART, USB, ETC.) WITHIN THE SINGLE UNIT |
| MICOM | Tucom | SW_ucom | IO_ucom | Tucom = SW_ucom / IO_ucom | |
| GPS | Tgps | SW_gps | IO_gps | Tgps = SW_gps / IO_gps | |
| DMB | Tdmb | SW_dmb | IO_dmb | Tdmb = SW_dmb / IO_dmb | |
| Bluetooth | Tbt | SW_bt | IO_bt | Tbt = SW_bt / IO_bt | |
| MODEM | Tmdm | SW_mdm | IO_mdm | Tmdm = SW_mdm / IO_mdm | |
| EXT. AMP | Tamp | SW_amp | IO_amp + IO_mmcom1 | Tamp = SW_amp / IO_amp | REMOVABLE EXTERNAL DEVICE CONNECTED THROUGH MULTIMEDIA COMMUNICATION SUCH THAT ADDITIONAL CONSIDERATION FOR A TRANSFER TIME IS NEEDED |
| MONITOR | Tdisp | SW_disp | IO_disp + IO_mmcom2 | Tdisp = SW_disp / IO_disp | |
| KEY-BOARD | Tkbd | SW_kbd | IO_kbd + IO_mmcom3 | Tkbd = SW_kbd / IO_kbd | |

FIG.8

METHOD AND APPARATUS FOR CONTROLLING ELECTRONIC DEVICE OF VEHICLE

This application claims priority to Korean Patent Application No. 10-2016-0077918, filed on Jun. 22, 2016 in the Korean Intellectual Property Office, the disclosure of which is hereby incorporated by reference in its entirety as if fully set forth herein.

BACKGROUND

Technical Field

A method and apparatus are disclosed for controlling an electronic device of a vehicle, and more particularly to a method and apparatus for reducing a time consumed for upgrading software related to an electronic device embedded in the vehicle, increasing vehicle extensibility, and providing better services and functions to a vehicle driver through the electronic device.

Discussion of the Related Art

With the rapid development of information technology (IT), technology for providing various kinds of information to vehicle drivers or users has been developed and come into widespread use. With the increasing demand and expectation of drivers or users of vehicles, user interest in In-Vehicle Infotainment (IVI) is rapidly increasing. Infotainment may refer to a compound word of Information and Entertainment, and may indicate a system implemented by addition of amusement and information delivery. The In-Vehicle Infotainment (IVI) may refer to an integrated system capable of supporting connection to GPS navigation or instrument clusters, trip computers, Audio-Video (AV) systems, DMB/MP3/audio systems, and external devices. In order to provide IVI functions, precise software and firmware are needed. With the increasing size and complexity of software embedded in vehicles, there is a need to stably and efficiently manage and maintain the software.

In order to address software stability issues, many vehicle manufacturing companies have been intensively developed methods for performing high-level Quality Assurance (QA) processes in a manufacturing stage, and have been largely dependent upon methods for updating software in sales agency and auto-repair shops related to affiliated concerns. Although the QA process is a necessary or requisite process, Time-to-Market (TTM) indicating the release date of new vehicles has been unavoidably delayed. If software is updated by sales agency, after-sales service costs of vehicle manufacturing companies are unavoidably increased.

In order to address the above-mentioned issues, there is a need to develop various wired/wireless software update processing methods. Specifically, software update over a wireless network needs to exchange information between a server and a terminal according to communication standards established by Open Mobile Alliance (OMA), and also needs to update the latest software to terminals through transmission and reception of new software.

SUMMARY

Accordingly, a method and apparatus are disclosed for controlling an electronic device of a vehicle that substantially obviates one or more problems due to limitations and disadvantages of the related art.

An apparatus and method are provided for receiving data needed for update of software needed for driving in-vehicle electronic devices, calculating a maximum update time for each data type or for each update target region, and parallel-updating the software through distributed processing, resulting in reduction of a processing time to be consumed for software update.

A method and apparatus are further provided for exchanging information between a server and a terminal according to standards established by Open Mobile Alliance (OMA), reducing a time to be consumed for software update when in-vehicle electronic devices are powered on or off, resulting in reduction of battery power consumption in vehicles.

Additional advantages, objects, and features will be set forth in part in the description which follows and in part will become apparent to those having ordinary skill in the art upon examination of the following or may be learned from practice of the features. The objectives and other advantages of the features may be realized and attained by the structure particularly pointed out in the written description and claims hereof as well as the appended drawings.

To achieve these objects and other advantages and in accordance with the purpose of the features, as embodied and broadly described herein, a method for controlling software needed to drive an in-vehicle electronic device includes: receiving a data package including a plurality of data needed to update software of a vehicle; and applying a parallel update procedure or a sequential update procedure according to whether a primary data (e.g., a first partial data) includes updates for a central processing unit (CPU).

A first partial data may be updated according to the sequential update procedure, and the plurality of a second partial data other than the first partial data may be updated according to the parallel update procedure.

The applying the parallel update procedure or the sequential update procedure may include: calculating an update time of each of the plurality of second partial data; calculating the sum of update times by identifying a plurality of update times according to a plurality of groups, and controlling the sum of update times of the respective groups not to exceed a maximum update time; classifying the second partial data corresponding to the update time contained in each group according to the respective groups; and parallel-updating the second partial data classified according to the respective groups.

The calculating the update time may include: searching for an update speed corresponding to a system element to which the second partial data will be applied; and calculating the update time on the basis of the update speed and the size of the second partial data.

The update speed may be a predetermined value for determining whether the system element is an on-board device or for determining whether the system element interacts with another device through an external connection terminal, such that the determined results are applied to the system element.

The controlling the sum of update times of the respective groups not to exceed a maximum update time may include: determining a first group in which a maximum update time from among the plurality of update times is set to a maximum value; performing a first step, which arranges a first update time from among the update times each shorter than the maximum value to a new group instead of the first group, and adds a second update time from among the update times to the new group; and performing a second step, which adds a third update time when the sum of the first update time and the second update time within the new group is shorter than the maximum value, and moves the second update time to another new group when the sum of times of the new group exceeds the maximum value, wherein the first step and the second step are repeatedly performed in a manner that the plurality of update times are grouped.

The method may further include: recognizing a category of partial data contained in the data package; and calculating an update time of the partial data according to the category of the partial data.

The partial data may be differential data or image data, and the update time may be established according to the category of the partial data.

A first partial data may include not only update information regarding the central processing unit (CPU), but also update information regarding an external amplifier, a monitor, and a keyboard.

In accordance with another feature, an apparatus is for controlling software needed to drive at least one electronic device in a vehicle including a processing system that comprises at least one processor and at least one computer-readable memory storing a computer program. Herein, the processing system is configured to cause the apparatus to: receive a data package including a plurality of partial data needed to update software of a vehicle; and apply a parallel update procedure or a sequential update procedure according to whether a first partial data to be updated through a central processing unit (CPU) is contained in the data package.

In accordance with another feature, a non-transitory computer readable medium can store a program causing a processing system to execute a process for receiving a data package including a plurality of partial data needed to update software of a vehicle; and applying a parallel update procedure or a sequential update procedure according to whether first partial data to be updated through a central processing unit (CPU) is contained in the data package.

In accordance with another feature, an apparatus for controlling software needed to drive an in-vehicle electronic device includes: a data receiver for receiving a data package including a plurality of partial data needed to update software of a vehicle; and a controller for applying a parallel update procedure or a sequential update procedure according to whether first partial data to be updated through a central processing unit (CPU) is contained in the data package.

The first partial data may be updated according to the sequential update procedure, and the plurality of second partial data other than the first partial data may be updated according to the parallel update procedure.

The controller calculates an update time of each of the plurality of second partial data; calculates the sum of update times by identifying a plurality of update times according to a plurality of groups, and controls the sum of update times of the respective groups not to exceed a maximum update time; classifies the second partial data corresponding to the update time contained in each group according to the respective groups; and parallel-updates the second partial data classified according to the respective groups.

The controller configured to calculate the update time searches for an update speed corresponding to a system element to which the second partial data will be applied; and calculates the update time on the basis of the update speed and the size of the second partial data.

The update speed may be a predetermined value for determining whether the system element is an on-board device or for determining whether the system element interacts with another device through an external connection terminal, such that the determined results are applied to the system element.

The controller configured to control the sum of update times of the respective groups not to exceed a maximum update time determines a first group in which a maximum update time from among the plurality of update times is set to a maximum value; performs a first step, which arranges a first update time from among the update times each shorter than the maximum value to a new group instead of the first group, and adds a second update time from among the update times to the new group; and performs a second step, which adds a third update time when the sum of the first update time and the second update time within the new group is shorter than the maximum value, and moves the second update time to another new group when the sum of times of the new group exceeds the maximum value, wherein the first step and the second step are repeatedly performed in a manner that the plurality of update times are grouped.

The controller may recognize a category of partial data contained in the data package; and may calculate an update time of the partial data according to the category of the partial data.

The partial data may be differential data or image data, and the update time may be established according to the category of the partial data.

The first partial data may include not only update information regarding the central processing unit (CPU), but also update information regarding an external amplifier, a monitor, and a keyboard.

It is to be understood that both the foregoing general description and the following detailed description are exemplary and explanatory and are intended to provide further explanation of the claimed features.

BRIEF DESCRIPTION OF THE DRAWINGS

The accompanying drawings, which are included to provide a further understanding of the features and are incorporated in and constitute a part of this application, illustrate form(s) of the disclosed features and together with the description serve to explain the principle of the disclosed features. In the drawings:

FIG. 1 is a conceptual diagram illustrating a sequential update procedure and a parallel update procedure;

FIG. 7 is a flowchart illustrating a method for calculating an update time according to data;

FIG. 8 is a conceptual diagram illustrating a method for calculating an update time according to in-vehicle electronic devices.

DETAILED DESCRIPTION

Hereinafter, an apparatus and method according to forms of the disclosed features will be described with reference to the accompanying drawings. In the following description, a suffix "module" or "unit" contained in terms of constituent elements to be described will be selected or used together in consideration only of the convenience of writing the following specification, and the suffixes "module" and "unit" do not necessarily have different meanings or roles. The "modules" and "units" described herein may be representative of a combination of software, hardware, and circuitry components for implementing the related processes attributed to the "modules" and "units" described herein.

In the following description, assuming that a certain object is formed above (over) or below (beneath) the respective constituent elements, this means that two constituent elements are brought into direct contact with each other, one or more constituent elements are disposed and formed between two constituent elements. In addition, assuming that a certain object is formed over or below the respective constituent elements, this means that the object may also be arranged in upward or downward direction on the basis of the position of one constituent element.

FIG. 1 is a conceptual diagram illustrating a sequential update procedure and a parallel update procedure. In more detail, FIG. 1(a) is a conceptual diagram illustrating a sequential update procedure for sequentially updating the in-vehicle electronic devices, and FIG. 1(b) is a conceptual diagram illustrating a parallel update procedure for parallel-updating the in-vehicle electronic devices.

Referring to FIG. 1(a), all software programs are simply and sequentially updated to update the in-vehicle electronic devices, resulting in an increased update time. After the beginning of update, the system can be updated and a microprocessor (e.g., CPU) can be updated. Thereafter, GPS, model, etc. embedded in the vehicle can be sequentially updated. The parallel update procedure shown in FIG. 1(a) may be changed not only according to whether update is needed, but also according to categories of the in-vehicle electronic devices.

Referring to FIG. 1(b), the parallel update procedure for simultaneously processing a plurality of update processes within the respective regions is performed such that the update time can be reduced. In order to apply the parallel update procedure, update logic may be constructed. According to the update logic, the parallel update procedure may receive update software received over a wired or wireless network in association with the in-vehicle electronic devices, may determine whether update is available within each target region to be updated, and may simultaneously parallel-process the remaining regions other than a specific region having the longest update time.

Figure 2:
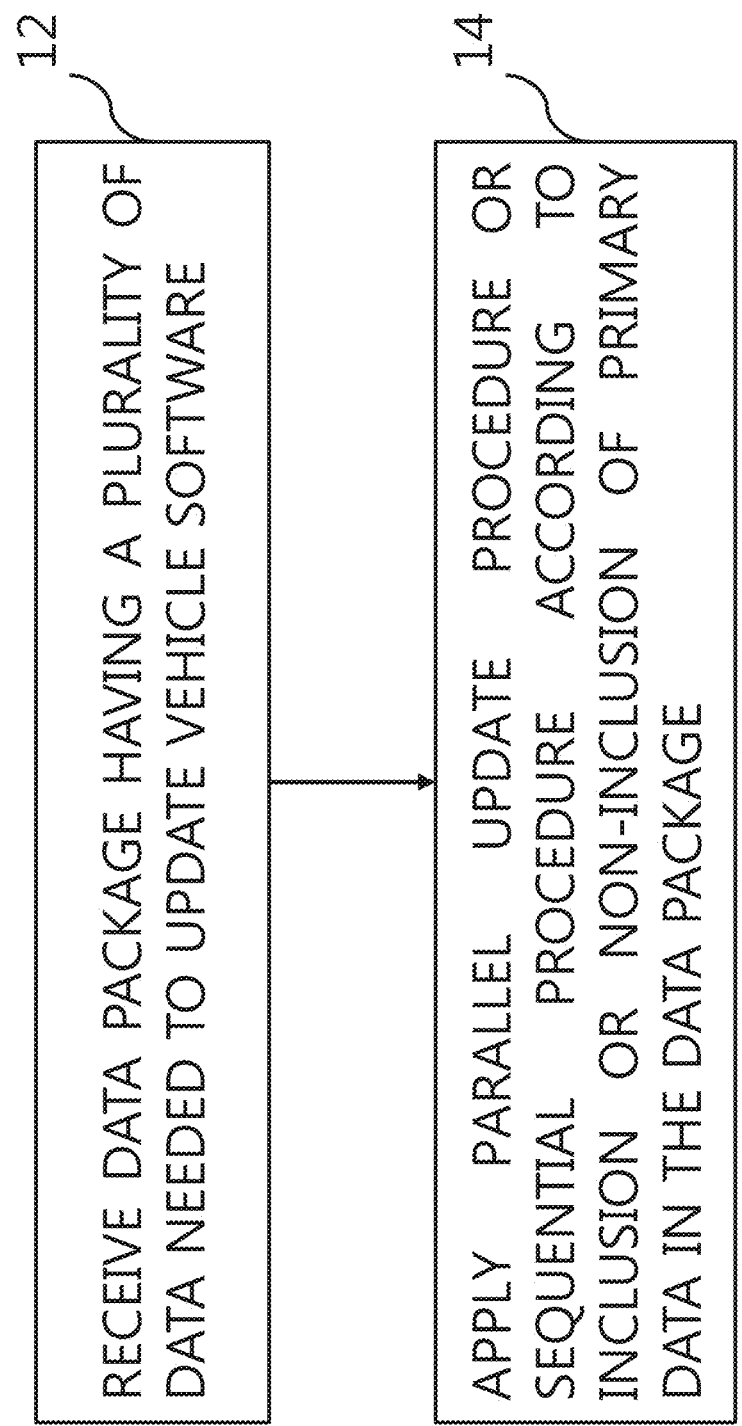
FIG. 2 is a flowchart illustrating a method for controlling software needed to drive in-vehicle electronic devices.

FIG. 2 is a flowchart illustrating a method for controlling software needed to drive in-vehicle electronic devices.

Referring to FIG. 2, a method for controlling software needed to drive the in-vehicle electronic devices may include receiving a data package including a plurality of partial data for updating vehicle software (step 12); and applying a parallel update procedure or a sequential update procedure according to inclusion or non-inclusion of first partial data including update information for a CPU (e.g., a Micom Controller (MICOM), etc.) (step 14). In this case, the first partial data may be updated according to the sequential update procedure, and several second partial data segments other than the first partial data may be updated according to the parallel update procedure.

A method for controlling update of the in-vehicle electronic devices may determine whether update of software received through wired/wireless networks is available in each update target (i.e., each electronic device). In recent times, to satisfy the demand (or needs) of users or drivers, the in-vehicle electronic devices have become more diversified, and the number of in-vehicle electronic devices is rapidly increasing. It is difficult for the parallel update procedure to be applied to the in-vehicle electronic devices that are updated by the microprocessor (e.g., Micom) during the update process of the plurality of electronic devices, such that the in-vehicle electronic devices can be sequentially updated by the microprocessor. For example, first partial data may include update information regarding a CPU, an external amplifier, a monitor, and a keyboard.

In contrast, the parallel update procedure may be applied to the in-vehicle electronic device which need not be updated by the microprocessor, such that the remaining regions other than a specific region having a maximum update time can be simultaneously updated.

In addition, the respective update regions may have different update consumption times. For example, software for driving the in-vehicle AVN system, system software, software of each module, microprocessor firmware, and software of external devices (e.g., external amplifiers, monitors, keyboards, etc.) may be updated. In this case, different regions may be simultaneously or sequentially updated on the basis of the maximum update consumption time, such that the update time needed for the entire system can be effectively reduced.

Reduction of the update time can minimize battery power consumption of the vehicle, such that more various and higher-quality update services can be provided. For example, a processing time needed to update mass storage information (e.g., map data used by the in-vehicle navigation device) can be greatly reduced during the night time in which the vehicle is not used. In more detail, mass storage information such as map data may be classified into a road region, a search/PIO region, a background region, etc., and the classified regions can be simultaneously updated according to performances of the CPU configured to drive the in-vehicle computing device or the navigation system. Specifically, assuming that software for driving the in-vehicle electronic devices can be executed over the wireless network and the vehicle is a single Internet of Things (IoT) function, the software for driving the in-vehicle electronic devices can be frequently updated. Reduction of the update consumption time may be requested to effectively provide many more services to the vehicle users or drivers.

Meanwhile, reduction of the update consumption time can be applied not only to the vehicle AVN terminal to which the software update function can be applied over the wired/wireless networks, but also to all kinds of mobile IT devices such as a smartphone.

Figure 3:
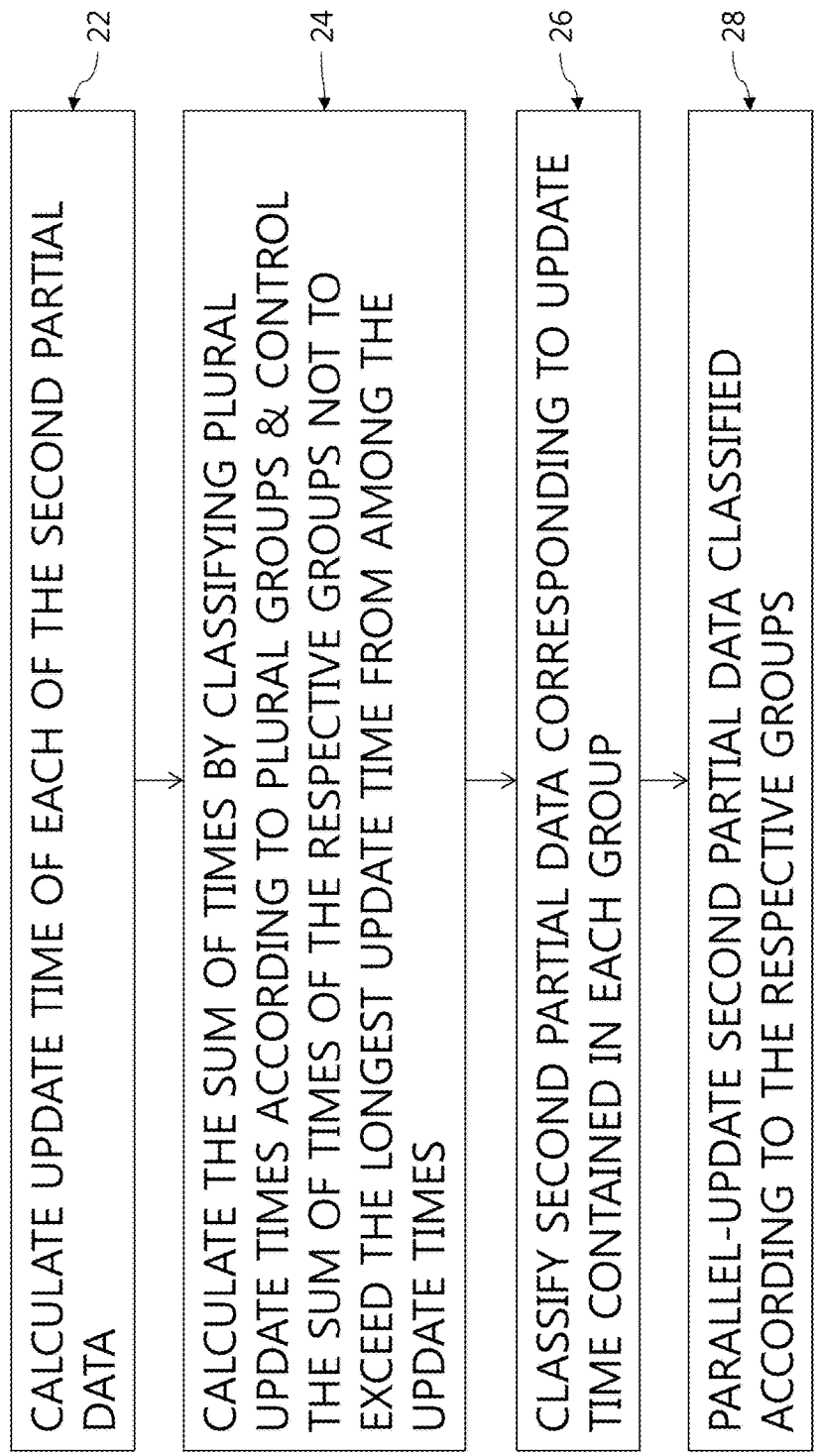
FIG. 3 is a flowchart illustrating a method for applying a parallel update procedure.

FIG. 3 is a flowchart illustrating a method for applying a parallel update procedure. The application method of the parallel update procedure may be applied to several second partial data segments other than the first partial data to which the sequential update procedure must be applied.

Referring to FIG. 3, the application method of the parallel update procedure may include calculating an update time of each second partial data (step 22); calculating the sum of times by classifying the plurality of update times into a plurality of groups in a manner that the sum of times of the respective groups does not exceed the longest time from among the update times (step 24); classifying second partial data corresponding to the update time contained in each group (step 26); and parallel-updating the second partial data for each group (step 28).

During the parallel update procedure, the remaining second partial data segments other than specific second partial data having a maximum update time may be classified into the plurality of groups. For example, after the respective update times of several second partial data segments are calculated, it is assumed that the update time is 1 minute, 3 minutes, 5 minutes, 7 minutes, or 10 minutes. The longest update time among the above-mentioned update times is 10 minutes, and the remaining update times are summed up, and the sum of the remaining update times is shorter than 10 minutes, one group may be constructed. The sum of update times of three second partial data segments corresponding to 1 minute, 3 minutes, and 5 minutes is a total of 9 minutes shorter than 10 minutes, such that one group can be constructed. Thereafter, the second partial data corresponding to 7 minutes may be discriminated as a separate group. That is, the second partial data is classified into a first group in which the update time of 10 minutes is consumed, a second group comprised of three second partial data segments in which an update time of 1 minute, an update time of 3 minutes, and an update time of 5 minutes are consumed, and a third group in which the update time of 7 minutes is consumed, such that the respective groups can be updated in a parallel manner. If the first to third groups are updated in a parallel manner, a time consumed to perform all update processing may be 10 minutes. Compared with a total time (26 minutes) consumed to sequentially perform all update processing, a time consumed for parallel update can be greatly reduced to 10 minutes.

Figure 4:
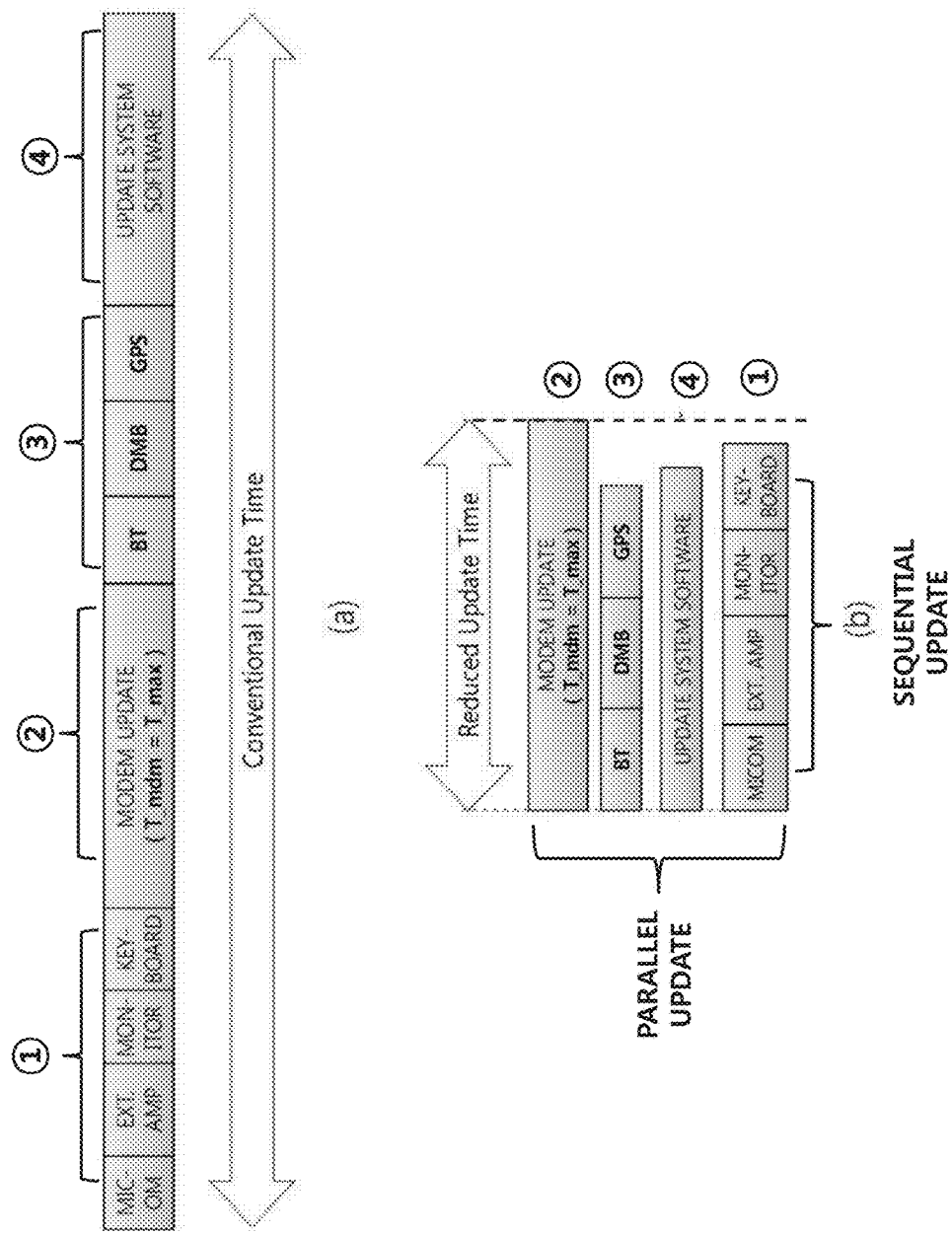
FIG. 4 is a conceptual diagram illustrating the effects acquired by the parallel update procedure.

FIG. 4 is a conceptual diagram illustrating the effects acquired by the parallel update procedure. In more detail, FIG. 4(a) is a conceptual diagram illustrating the update time needed for the sequential update procedure, and FIG. 4(b) is a conceptual diagram illustrating the update time needed for the parallel update procedure.

It is assumed that several in-vehicle electronic devices are updated. For example, if it is expected that a microprocessor, an external amplifier, a monitor, a keyboard, a modem, etc. is updated, and if the sequential update procedure is applied as shown in FIG. 4(a), a total time corresponding to the sum of times consumed for respective update processes may be determined to be a duration time needed to perform all update processing.

In contrast, if the parallel update procedure is performed as shown in FIG. 4(b), the remaining update times are classified into a plurality of groups (1~4) on the basis of the modem update corresponding to a maximum time from among time sections consumed to perform the respective update processes, such that the parallel update processing may be performed according to the plurality of groups (1~4). In this case, the update time can be reduced to a predetermined time consumed to update the modem (i.e., the longest consumption time), instead of the sum of consumption times of the respective update processes.

Figure 5:
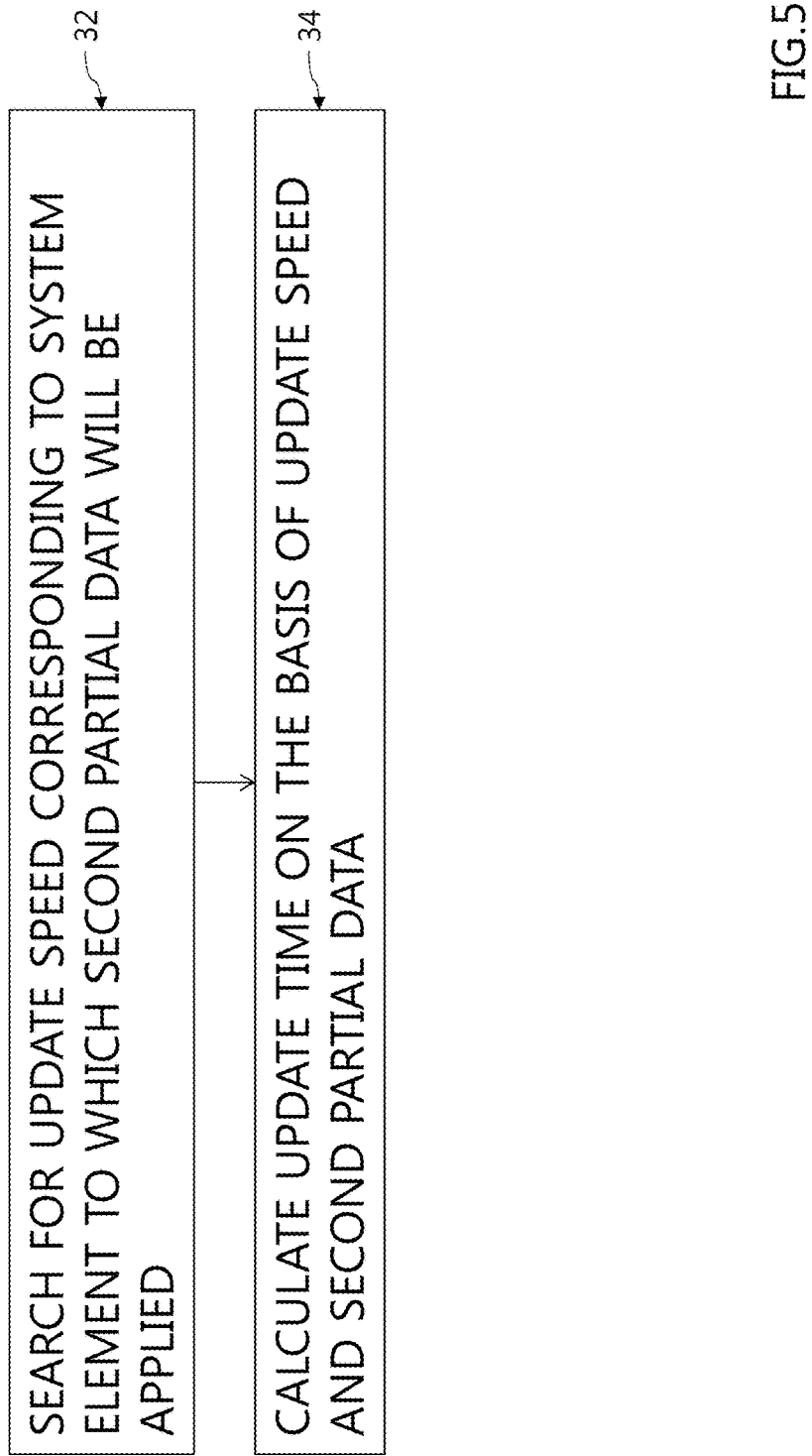
FIG. 5 is a flowchart illustrating a method for calculating an update time.

FIG. 5 is a flowchart illustrating the step 22 for calculating an update time.

Referring to FIG. 5, the step 22 for calculating the update time may include searching for an update speed corresponding to a system element to be the second partial data will be applied; and calculating an update time on the basis of the update speed and the size of the second partial data.

The update speed may be changed according to the in-vehicle electronic device or the system element is an on-board device or interacts with other devices via an external connection terminal. Typically, the on-board electronic device may have a higher update speed than the other electronic device interacting with other devices through the external connection terminal.

For example, the update speed of each in-vehicle electronic device can be measured through testing, and the measured update speed may be pre-stored in a storage unit. Thereafter, if update information of the corresponding electronic device is received, the in-vehicle electronic device may determine the update speed by searching for a predetermined value stored in the storage unit.

If the update speed is determined, the update time may be calculated in consideration of the size of updated data. For example, the update time may be obtained by dividing the size of data by the update speed.

Figure 6:
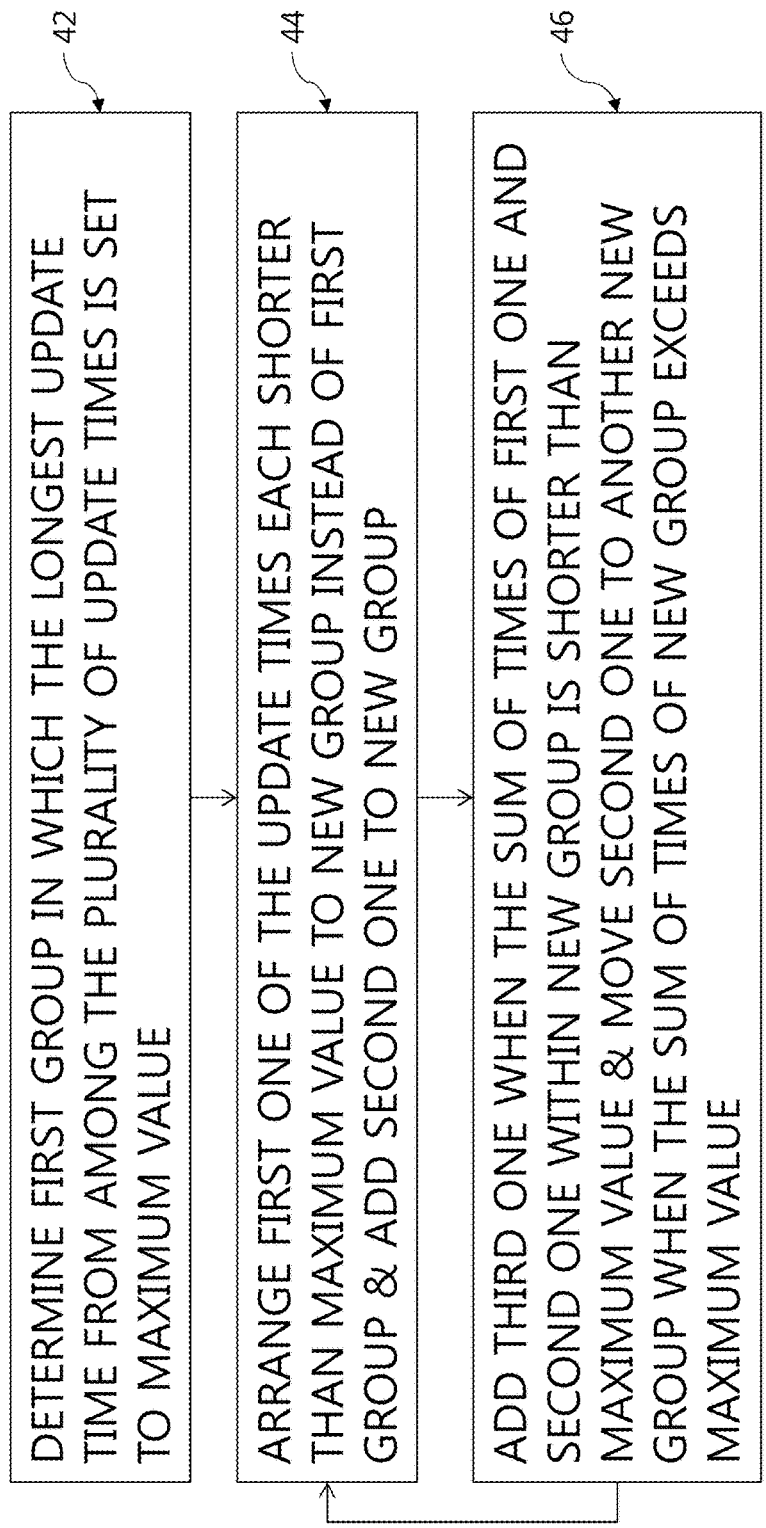
FIG. 6 is a flowchart illustrating a method for controlling the sum of times of respective groups not to exceed a maximum update time.

FIG. 6 is a flowchart illustrating a step (24) for controlling the sum of times of respective groups not to exceed a maximum update time.

Referring to FIG. 6, the controlling the sum of times of the respective groups not to exceed the longest time (step 24) may include: determining a first group in which the longest time from among the plurality of update times is set to a maximum value (step 42); performing a first process to arrange one of update times, each of which is shorter than the maximum value, to a new group instead of the first group, and adding the other one to the new group (step 44); and performing a second process to add the other one when the sum of one time and the other time within the new group is shorter than the maximum value, and moving the other one to the other new group when the sum of times of the new group exceeds the maximum value (step 46). Herein, the first and second processes (step 44, step 46) may be repeatedly carried out in such a manner that several update times are grouped.

For example, it is assumed that update of the first to fifth data is needed, the update consumption time of the first data is 10 minutes, the update consumption time of the second data is 8 minutes, the update consumption time of the third data is 5 minutes, the update consumption time of the fourth data is 4 minutes, and the update consumption time of the fifth data is 2 minutes. From among the update times of the first to fifth data, the update time (10 minutes) of the first data may be the longest maximum time. Thereafter, assuming that the update time (5 minutes) of the third data is added to the update time (8 minutes) of the second data, a total update time is 13 minutes, such that the total update time of 13 minutes may be longer than 10 minutes. In this case, the second data and the third data are distinguished from each other, such that the second data may be determined to be one group. Thereafter, assuming that the update time (4 minutes) of the fourth data is added to the update time (5 minutes) of third data, a total update time is 9 minutes shorter than the maximum value corresponding to 10 minutes. In this case, the third data and the fourth data may be the other group. Thereafter, if the fifth data may be another group. If the first to data segments are completely grouped, the step 24 for controlling the sum of times of the respective groups not to exceed the longest update time from among the update times may be completed.

FIG. 7 is a flowchart illustrating a method for calculating an update time according to data.

Referring to FIG. 7, the method for calculating the update time according to data may further include recognizing the type of partial data contained in the data package (step 52); and calculating the update time of the partial data according to the types of partial data (step 54). For example, the partial data may be differential data or image data. The update time may be changed based at least on whether the corresponding data is the differential data or the image data.

The method for calculating the update time for each data according to data types may be carried out when the data package including partial data for upgrade is received. In addition, after it is determined whether partial data is updated through the parallel update procedure or the sequential update procedure, a time changeable according to the data types may also be used to correctly calculate the update time.

FIG. 8 is a conceptual diagram illustrating a method for calculating an update time according to in-vehicle electronic devices.

As shown in FIG. 8, software for driving the in-vehicle electronic devices may include various programs needed to drive a system, a microprocessor, a GPS, a DMB, a Bluetooth, a modem, an external amplifier, a monitor, a keyboard, etc. For example, software for driving the AVN system may be classified into system software, software of each module, microprocessor firmware, and software of the external amplifier. Since the respective update regions have different update consumption times, other regions may be multi-processed by the simultaneous or sequential update on the basis of the longest update consumption time, such that the overall system update time can be reduced.

The update consumption time for each update target region constructing the AVN system can be calculated using the following equation.

$$\text{update time(sec)} = \frac{(\text{Software size(Bytes)})}{\{\text{IO\_input/outputspeed(Bytes/sec)} + \text{IO\_common(Bytes/sec)}\}} \quad [\text{Equation}]$$

In this case, IO_inp/output speed may be an experimental value indicating a per-second update size for each region, and IO_mmcom may be an experimental value of the multimedia communication transfer rate. Meanwhile, one or more kinds of communication methods may be mixed in multimedia communication. For example, IO_can, IO_lan, IO_flexray, IO_most, etc. may be used according to communication methods, and the respective communication transfer rates may be different from one another.

Figure 9:
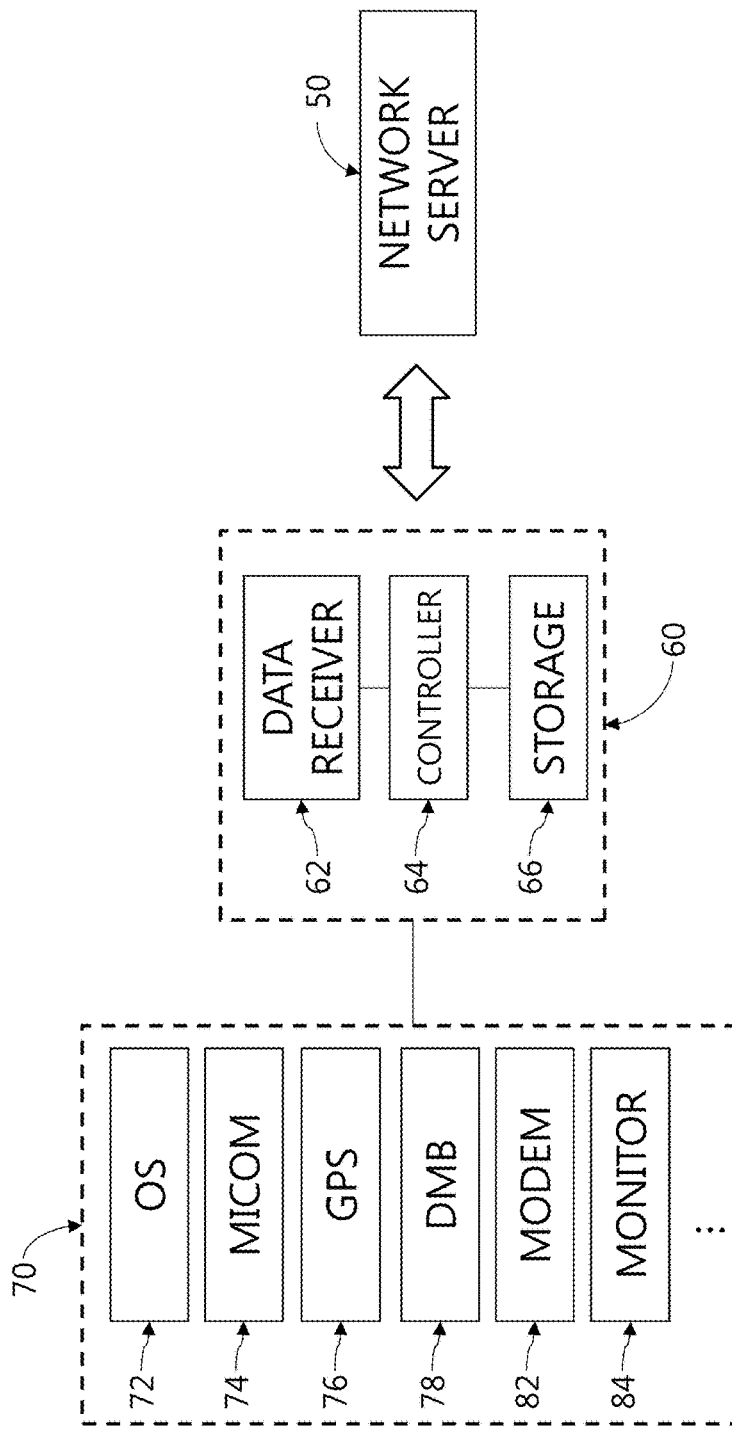
FIG. 9 is a block diagram illustrating an apparatus for controlling software needed to drive the in-vehicle electronic devices.

FIG. 9 is a block diagram illustrating an apparatus for controlling software needed to drive the in-vehicle electronic devices.

Referring to FIG. 9, the apparatus 60 for controlling software needed to drive the in-vehicle electronic device may interact with the network server 50 over a wired or wireless network. The apparatus 60 for controlling software needed to drive the in-vehicle electronic devices may update or manage the software configured to drive the in-vehicle electronic device 70. In this case, the in-vehicle electronic device 70 may include an operating system (OS) 72, a microprocessor 74, a GPS 76, a DMB 78, a modem 82, a monitor 84, etc. Update information of the CPU, the external amplifier, the monitor, the keyboard, etc. from among the in-vehicle electronic devices 70 should be sequentially updated through the microprocessor.

The apparatus 60 for controlling the software needed to drive the in-vehicle electronic device may include a data receiver 62 configured to receive a data package including several partial data segments for updating the vehicle software; and a controller 64 for applying the parallel update procedure or the sequential update procedure according to whether or not the first partial data including information for the CPU. In addition, the apparatus 60 for controlling the software needed to drive the in-vehicle electronic device may further include a storage unit 66 capable of storing the per-element update speed contained in the in-vehicle electronic device 70.

The first partial data may be updated according to the sequential update procedure, and several second partial data segments other than the first partial data may be updated according to the parallel update procedure.

The controller 64 may calculate the update time for each second partial data, may classify a plurality of update times into a plurality of groups so as to calculate the sum of times, and may control the sum of times of the respective groups not to exceed the longest time from among the update times. In addition, the controller 64 may classify the second partial data corresponding to the update time contained in each group according to the respective groups, and may parallel-update the second partial data for each group.

In order to calculate the update time, the controller 64 may search for the update speed corresponding to the system element to which the second partial data will be applied, and the update time can be calculated on the basis of the update speed and the size of the second partial data.

The update speed may be a predetermined value for determining whether the system element contained in the in-vehicle electronic device 70 is an on-board device or for determining whether the system element interacts with another device through an external connection terminal, such that the determined results correspond to the system element.

In order to control the sum of times of the respective groups not to exceed the longest time from among the update times, the controller 64 may determine the longest time having a maximum value from among the plural update times to be a first group. The controller 64 may perform a first step for arranging one of the update times, each of which is shorter than the maximum value, to a new group instead of the first group, and arranging the other one to the new group. Thereafter, assuming that the sum of one time and the other time within the new group is shorter than the maximum value, the controller 64 may further add a still another time. Assuming that the sum of times of new groups exceeds a maximum value, the controller 64 performs a second step for moving the other one to the other new group. The controller 64 may repeatedly perform the first step and the second step in a manner that update times of several partial data segments are grouped.

Meanwhile, the controller 64 may recognize the type of partial data contained in the data package, and may calculate the update time of the partial data according to the type of partial data. For example, the partial data may be differential data or image data, and the update time may be established according to the type of partial data.

As described above, the apparatus for controlling update software needed to drive the in-vehicle electronic device may select software received over a wired or wireless network on the basis of a maximum update consumption time, and synthetically performs a simultaneous or sequential update procedure in other regions, such that the entire system software update time can be greatly reduced as compared to the conventional sequential update procedure.

As is apparent from the above description, the form of the present features selects software received over a wired or wireless network on the basis of a maximum update consumption time, and performs simultaneous or sequential update for other regions of vehicles, resulting in reduction of the entire update time of system software.

In addition, the audio video navigation (AVN) device contained in vehicles cannot use the corresponding function during software update. If software update time is reduced, the restarting time of the device is also shortened, such that user convenience and battery lifespan of the vehicle can be increased.

In addition, the present features can implement expansion and application of software update technology through distributed processing during application of a background update function, resulting in reduction of overhead of the in-vehicle central processing unit (CPU).

The method according to the forms may be manufactured as a program that can be executed by a computer and may be stored in recording media readable by the computer. Examples of the recording media readable by the computer may include a read only memory (ROM), a random access memory (RAM), a compact disc read only memory (CD-ROM), a magnetic tape, a floppy disk, and an optical data storage device. In addition, the recording media readable by the computer may also be realized in the form of a carrier wave (for example, transmission through the Internet).

The recording media readable by the computer may be distributed to computer systems connected to each other through a network such that a code readable by the computer is stored or executed in a distribution mode. In addition, a functional program, code, and code segments for embodying the above method may be easily reasoned by programmers in the art to which the disclosure pertains.

It will be apparent to those skilled in the art that various modifications and variations can be made in the present features without departing from the spirit or scope of the features. Therefore, the above-mentioned detailed description must be considered only for illustrative purposes instead of restrictive purposes. The scope of the present features must be decided by a rational analysis of the claims, and all modifications within equivalent ranges of the present features are within the scope of the present features.

What is claimed is:

1. A method for updating software related to operating an in-vehicle electronic device, comprising:
   receiving a data package including a plurality of data for updating software stored on the in-vehicle electronic device;
   recognizing a category of each of the plurality of data contained in the data package;
   classifying the recognized category according to predefined data types or update target regions; and
   applying one of a parallel update procedure and/or a sequential update procedure according to the classification of the recognized category;
   wherein the category is classified to a first type data and a second type data included in the data package, wherein the second type data is different from the first type data,
   grouping the second type data into a plurality of groups, wherein a sum of update times within each group does not exceed a maximum update time,
   wherein the first type data is updated through a central processing unit (CPU) and is updated according to a sequential update procedure, and
   updating groups of the plurality of groups of the second type data in parallel to each other.

2. The method according to claim 1, wherein calculating update times includes:
   searching for an update speed corresponding to a system element to which the second type data will be applied; and
   calculating the update times based on the update speed and a size of the second type data.

3. The method according to claim 2, wherein the update speed is a predetermined value for determining whether the system element is an on-board device or for determining whether the system element interacts with another device through an external connection terminal, such that the determined results are applied to the system element.

4. The method according to claim 1, further comprising assigning the plurality of update times for the second type data into the plurality of groups by:
   assigning a first group having a maximum update time from among the plurality of update times set to a maximum value;
   arranging a first set of update times from among the plurality of update times into a new group, where the first set of update times includes a first update time and a second update time, wherein both the first update time and the second update time are shorter than the maximum value; and
   adding a third update time to the new group when the sum of the first update time and the second update time is shorter than the maximum value, and moving the third update time to another new group when the sum of update times of the new group exceeds the maximum value.

5. The method according to claim 1, further comprising:
   calculating an update time of the data according to the category of the data.

6. The method according to claim 1, wherein the first type data includes update information corresponding to at least one more of the central processing unit (CPU), an external amplifier, a monitor, and a keyboard.

7. An apparatus for updating software needed to drive at least one electronic device in a vehicle including a processing system that comprises at least one processor and at least one computer-readable memory storing a computer program, wherein the processing system is configured to cause the apparatus to:
   receive a data package including a plurality of data for updating software stored on the at least one electronic device in the vehicle, wherein the plurality of data includes at least one of a first type data and a second type data, wherein the first type data and the second type data are classified according to predefined data types or update target regions;
   determine whether the data package includes the first type data, wherein the first type data is updated by a central processing unit (CPU) using a sequential update procedure; and
   grouping the second type data into a plurality of groups, wherein a sum of update times within each group does not exceed a maximum update time;
   updating groups of the plurality of groups of the second data type data in parallel to each other.

8. An apparatus for controlling software needed to drive an in-vehicle electronic device, comprising:
   a data receiver configured to receive a data package including a plurality of data for updating software stored on a vehicle, wherein the plurality of data includes at least one of a first type data and a second type data other than the first type data included in the data package, wherein the second type data is different from the first type data, wherein the first type data and the second type data are classified according to predefined data types or update target region; and
   a controller chip configured to:

determine whether the data package includes the first type data, wherein the first type data is updated by a central processing unit (CPU) using a sequential update procedure;

grouping the second type data into a plurality of groups, wherein a sum of update times within each group does not exceed a maximum update time;

updating groups of the plurality of groups of the second data type data in parallel to each other.

9. The apparatus according to claim 8, wherein the controller chip is configured to:

search for an update speed corresponding to a system element to which the second type data will be applied; and calculate the update times based on the update speed and a size of the second type data.

10. The apparatus according to claim 9, wherein the update speed is a predetermined value for determining whether the system element is an on-board device or for determining whether the system element interacts with another device through an external connection terminal, such that the determined results are applied to the system element.

11. The apparatus according to claim 8, wherein the controller chip is further configured to:

assign a first group having a maximum update time from among the plurality of update times set to a maximum value;

arrange a first set of update times from among the plurality of update times into a new group, where the first set of update times includes a first update time and a second update time each shorter than the maximum value; and add a third update time to the new group when the sum of the first update time and the second update time is shorter than the maximum value, and move the third update time to another new group when the sum of update times of the new group exceeds the maximum value.

12. The apparatus according to claim 8, wherein the controller chip is further configured to:

recognize a category of data contained in the data package; and calculate an update time of the data according to the category of the data.

13. The apparatus according to claim 8, wherein the first type data includes update information corresponding to at least one more of the central processing unit (CPU), an external amplifier, a monitor, and a keyboard.

* * * * *